United States Patent
Lange et al.

(10) Patent No.: US 6,871,134 B2
(45) Date of Patent: Mar. 22, 2005

(54) METHOD AND DEVICE FOR DETERMINING THE EXHAUST GAS RECIRCULATION MASS FLOW OF AN INTERNAL COMBUSTION ENGINE

(75) Inventors: Thorsten Lange, Braunschweig (DE); Burkhard Veldten, Edemissen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/735,438

(22) Filed: Dec. 12, 2003

(65) Prior Publication Data

US 2004/0148087 A1 Jul. 29, 2004

(30) Foreign Application Priority Data

Dec. 20, 2002 (DE) .......................... 102 60 322

(51) Int. Cl.⁷ .............................. F02D 21/08
(52) U.S. Cl. .................. 701/108; 123/568.21
(58) Field of Search ................ 701/108, 109, 701/102; 123/568.11, 568.21, 568.26

(56) References Cited

U.S. PATENT DOCUMENTS 5,738,126 A * 4/1998 Fausten ................. 123/568.21
6,622,704 B2 * 9/2003 Wienand et al. ....... 123/568.21

FOREIGN PATENT DOCUMENTS

| DE | 199 50 146 A1 | 4/2000 | ........... F02D/41/18 |
| DE | 44 22 184 C2 | 1/2003 | ........... F02D/41/18 |
| FR | 2 829 185 | * 3/2003 | ........... F02D/21/08 |

* cited by examiner

Primary Examiner—Hieu T. Vo
(74) Attorney, Agent, or Firm—Baker Botts L.L.P.

(57) ABSTRACT

For determining the exhaust gas recirculation mass flow and the exhaust gas recirculation rate of an internal combustion engine (1) dependent on this, it is proposed, while said internal combustion engine (1) is in operation, to adapt a characteristic curve, determined before said internal combustion engine (1) is initially started up, representing the cylinder mass flow ($dm_{zyl}$) supplied to the cylinders of said internal combustion engine (1), which is composed of the fresh air mass flow ($dm_{HFM}$) and the exhaust mass flow recirculated via an exhaust gas recirculation pipe (16), to said fresh air mass flow ($dm_{HFM}$), known for various operating points of said internal combustion engine. The exhaust gas recirculation mass flow ($dm_{AGR}$) is then determined as a function of said fresh air mass flow ($dm_{HFM}$), measured at a particular transient operating point of said internal combustion engine, using the adapted characteristic curve of said cylinder mass flow ($dm_{zyl}$).

12 Claims, 1 Drawing Sheet

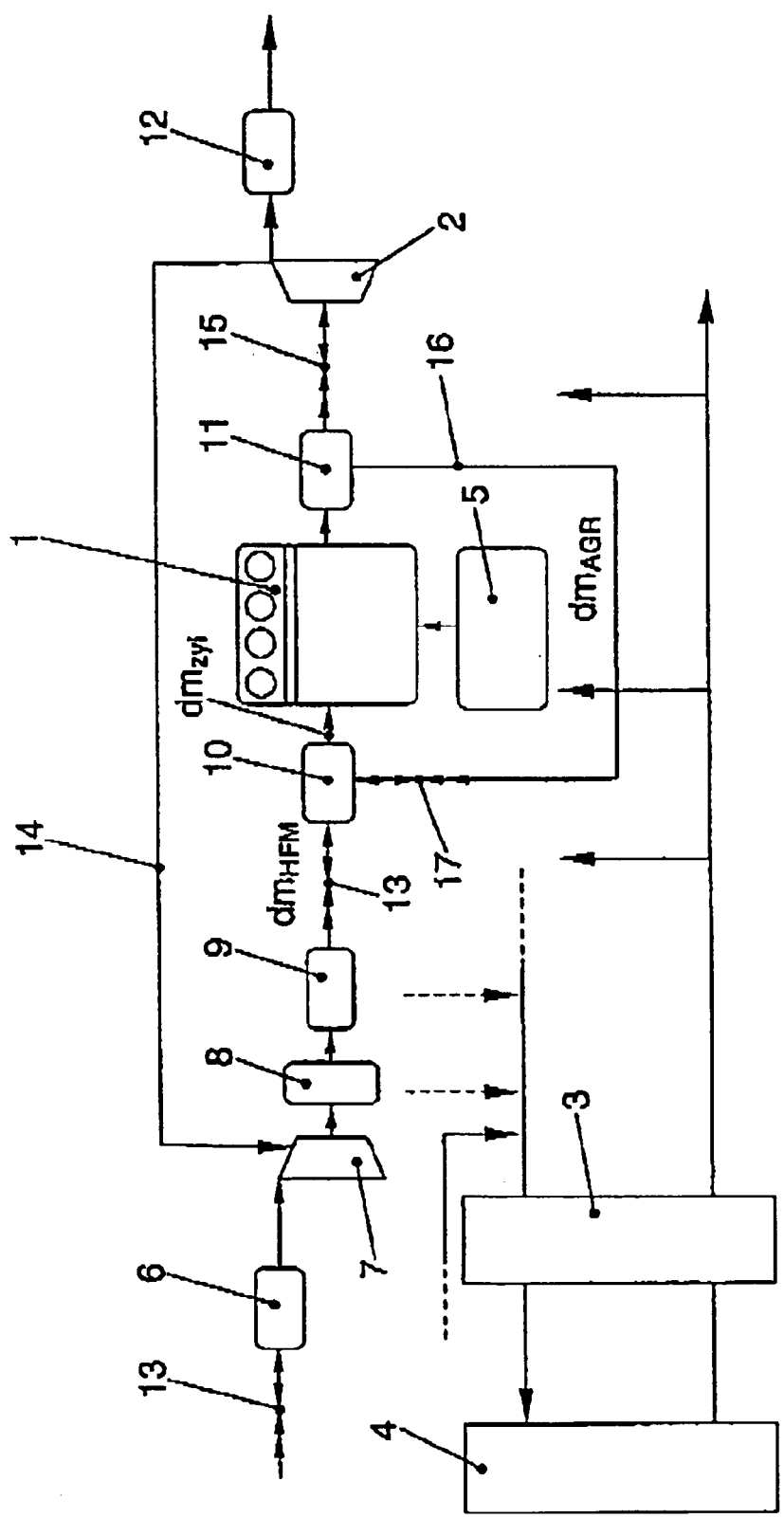
FIG.

METHOD AND DEVICE FOR DETERMINING THE EXHAUST GAS RECIRCULATION MASS FLOW OF AN INTERNAL COMBUSTION ENGINE

PRIORITY

This application claims foreign priority of the German application DE 10260322.7 filed on Dec. 20, 2002.

BACKGROUND OF THE INVENTION

The present invention relates to a method as well as a device for determining the exhaust gas recirculation mass flow of an internal combustion engine, for example a diesel engine. In particular the present invention relates to such a method and such a device, whereby using the information about the exhaust gas recirculation mass flow, acquired in this way, the exhaust gas recirculation rate can be correctly determined.

SUMMARY OF THE INVENTION

In order to regulate an internal combustion engine, for example a turbocharged diesel engine, exact knowledge of as many as possible operating parameters of the engine system is crucially important in particular for optimization of engine emissions. Such an operating parameter in the case of an internal combustion engine with exhaust gas recirculation is for example the exhaust gas recirculation mass flow, that is to say the mass flow of the exhaust gas emitted by the internal combustion engine, which is diverted via an exhaust gas recirculation pipe to a mixing point, where the exhaust gas is mixed with intake fresh air, in order to supply the fresh air/exhaust gas mixture resulting from this to the combustion chambers of the internal combustion engine. The so-called exhaust gas recirculation rate, that is to say the ratio between the intake fresh air mass flow and the exhaust gas recirculation mass flow, is also important with regard to compliance with the vehicle exhaust regulations.

At present the exhaust gas recirculation mass flow can only be measured with expensive or short-life sensors. Empirically or physically based models, with which the exhaust gas recirculation mass flow can be derived from other operating parameters of the engine system, are not sufficiently accurate.

Also the use of conventional methods to determine the exhaust gas recirculation rate is particularly susceptible to errors.

The entire or cylinder mass flow $dm_{zyl}$ sucked into the respective cylinder or combustion chamber of the internal combustion engine is initially calculated implicitly from various operating parameters obtained by test bench measurements to determine these. In addition to these further operating parameters are in particular the pressure and temperature in the connection (the so-called intake pipe) between the mixing point mentioned above and the cylinder as well as the amount of air-fuel mixture injected and the engine speed in question, whereby based on the test bench measurements the cylinder mass flow, which in principle corresponds to the sum of the fresh air mass flow $dm_{HFM}$ and the exhaust gas recirculation mass flow $dm_{AGR}$ is calculated as a function of these operating parameters in the form of a characteristic diagram, that is to say it is thereby known what cylinder mass flow arises at which operating parameter values. The intake fresh air mass flow is measured with the aid of an air flow sensor, for example a hot film-air flow sensor, in the intake area. The exhaust gas recirculation mass flow $dm_{AGR}$ results from the difference between the cylinder mass flow $dm_{zyl}$ and the fresh air mass flow $dm_{HFM}$ measured during operation:

$$dm_{AGR}=dm_{zyl}-dm_{HFM} \quad (1)$$

The exhaust gas recirculation rate $\Gamma_{AGR}$ sought then results from forming a ratio:

$$\Gamma_{AGR}=dm_{AGR}/dm_{HFM} \quad (2)$$

Only for the sake of completeness it is pointed out that whilst actual implementation can deviate somewhat from the method described above, in principle it is attributed to this algorithm.

The method described above is sensitive in its reaction to tolerances of the measurement signals and production-related tolerances of the intake area. A difference in the absolute errors of the two specific mass flows $dm_{HFM}$ and $d_{zyl}$ is directly integrated in the exhaust gas recirculation mass flow $dm_{AGR}$, which is determined as a relatively minor difference between two relatively large amounts and therefore with high sensitivity, whereby for example the error when measuring the cylinder mass flow $dm_{zyl}$ is essentially composed of production-related tolerances of the charge air section and measurement errors in the charge pressure sensor and charge temperature sensor, whilst the errors when measuring the fresh air mass flow $dm_{HFM}$ are essentially attributable to measurement errors in the air flow sensor. An error of −5% when determining the cylinder mass flow $dm_{zyl}$ and an error of +5% when determining the fresh air mass flow $dm_{HFM}$ incorrectly result in an extra exhaust gas recirculation mass flow $dm_{AGR}$ of 10% of the fresh air mass flow.

Therefore not only the exhaust gas recirculation mass flow $dm_{AGR}$ but also the exhaust gas recirculation rate $\Gamma_{AGR}$ is determined with errors and compliance with stricter exhaust regulations in the future, circumstances permitting, may not be possible.

SUMMARY OF THE INVENTION

The object of the present invention is therefore to provide a method as well as an appropriately designed device for determining the exhaust gas recirculation mass flow of an internal combustion engine, in which as exact as possible a determination of the exhaust gas recirculation mass flow and in particular as exact as possible a determination of the exhaust gas recirculation rate are feasible.

This objective can be achieved according to the invention a method for determining the exhaust gas recirculation mass flow of an internal combustion engine, comprising the steps of:

mixing fresh air with exhaust gas from the internal combustion engine recirculated via an exhaust gas recirculation pipe, supplying the resulting gas mixture to at least one cylinder of the internal combustion engine, determining the exhaust gas recirculation mass flow of the exhaust gas recirculated via the exhaust gas recirculation pipe by determining a characteristic curve, dependent on various operating parameters of the internal combustion engine, representing the cylinder mass flow of the gas mixture supplied to the at least one cylinder of the internal combustion engine, measuring the fresh air mass flow of the fresh air, adapting the characteristic curve of the cylinder mass flow to the fresh air mass flow known for various operating points of the internal combustion engine, and determining the exhaust gas recirculation mass flow as a function of the fresh air mass flow measured at a particular transient operating point of the internal combustion engine, using the adapted characteristic curve of the cylinder mass flow.

The characteristic curve of the cylinder mass flow can be adapted to the fresh air mass flow known for the various operating points of the internal combustion engine, in such a manner that for each of these operating points in the case of at least one known exhaust gas recirculation mass flow the equation $dm_{AGR}=dm_{zyl}-dm_{HFM}$ is at least approximately true, whereby $dm_{AGR}$ designates the known exhaust gas recirculation mass flow, $dm_{zyl}$ the cylinder mass flow according to the adapted characteristic curve and $dm_{HFM}$ the particular known fresh air mass flow. The characteristic curve of the cylinder mass flow can be adapted to the fresh air mass flow known for the various operating points of the internal combustion engine, such that for each of these operating points in the case of a known exhaust gas recirculation mass flow of zero the equation $dm_{zyl}=dm_{HFM}$ is true. The exhaust gas recirculation rate of the exhaust gas recirculated via the exhaust gas recirculation pipe can be calculated from the exhaust gas recirculation mass flow determined in each case in accordance with the method and the fresh air mass flow measured in each case by forming a ratio. The characteristic curve of the cylinder mass flow can be adapted while the internal combustion engine is in operation. The exhaust gas recirculating mass flow can be determined at each operating point of the internal combustion engine from the adapted characteristic curve for the cylinder mass flow, and the fresh air mass flow can be measured in each case at this operating point in accordance with the equation $dm_{AGR}=dm_{zyl}-dm_{HFM}$, whereby $dm_{AGR}$ designates the exhaust gas recirculating mass flow to be determined, $dm_{zyl}$ the cylinder mass flow in accordance with the adapted characteristic curve and $dm_{HFM}$ the fresh air mass flow measured in each case.

The object can further be achieved by a device for determining the exhaust gas recirculation mass flow of an internal combustion engine, comprising:

an exhaust gas recirculation pipe for recirculating fresh air mixed with an exhaust gas from the internal combustion engine at least one cylinder of the internal combustion engine receiving said gas mixture, fresh air mass flow measuring means for measuring the fresh air mass flow of the fresh air, exhaust gas recirculation mass flow determination means for determining the exhaust gas recirculating mass flow of the exhaust gas recirculated via the exhaust gas recirculation pipe, whereby the exhaust gas recirculation mass flow determination means are designed in such a way that they determine the exhaust gas recirculation mass flow on the basis of a characteristic curve of the cylinder mass flow of the gas mixture supplied to the at least one cylinder of the internal combustion engine, dependent on various operating parameters of the internal combustion engine and on the basis of the fresh air mass flow measured by the fresh air mass flow measuring means, wherein the exhaust gas recirculation mass flow determination means are designed in such a way that they adapt the characteristic curve of the cylinder mass flow to the fresh air mass flow known for various operating points of the internal combustion engine, and determine the exhaust gas recirculation mass flow as a function of the fresh air mass flow measured at a particular transient operating point of the internal combustion engine using the adapted characteristic curve of the cylinder mass flow.

The exhaust gas recirculation mass flow determination means can be designed to adapt the characteristic curve of the cylinder mass flow to the fresh air mass flow known for the various operating points of the internal combustion engine, in such a manner that for each of these operating points in the case of at least one known exhaust gas recirculation mass flow the equation $dm_{AGR}=dm_{zyl}-dm_{HFM}$ is at least approximately true, whereby $dm_{AGR}$ designates the known exhaust gas recirculation mass flow, $dm_{zyl}$ the cylinder mass flow according to the adapted characteristic curve and $dm_{HFM}$ the particular known fresh air mass flow. The exhaust gas recirculation mass flow determination means can be designed to adapt the characteristic curve of the cylinder mass flow to the fresh air mass flow known for the various operating points of the internal combustion engine, such that for each of these operating points in the case of a known exhaust gas recirculation mass flow of zero the equation $dm_{zyl}=dm_{HFM}$ is true. The exhaust gas recirculation mass flow determination means can be designed to calculate the exhaust gas recirculation rate of the exhaust gas recirculated via the exhaust gas recirculation pipe from the exhaust gas recirculation mass flow determined in each case in accordance with the method and the fresh air mass flow measured in each case by forming a ratio. The exhaust gas recirculation mass flow determination means can be designed to adapt the characteristic curve of the cylinder mass flow while the internal combustion engine is in operation. The exhaust gas recirculation mass flow determination means can be designed to determine the exhaust gas recirculating mass flow at each operating point of the internal combustion engine from the adapted characteristic curve for the cylinder mass flow, and to measure the fresh air mass flow in each case at this operating point in accordance with the equation $dm_{AGR}=dm_{zyl}-dm_{HFM}$, whereby $dm_{AGR}$ designates the exhaust gas recirculating mass flow to be determined, $dm_{zyl}$ the cylinder mass flow in accordance with the adapted characteristic curve and $dm_{HFM}$ the fresh air mass flow measured in each case.

To determine the exhaust gas recirculation mass flow according to the invention as in the case of the conventional process described above, the fresh air mass flow is measured in order to determine dependent on this the exhaust gas recirculation mass flow while the internal combustion engine is in operation by evaluating the cylinder mass flow, which comprises the exhaust gas recirculation mass flow and the fresh air mass flow. In this case however while the engine is in operation a characteristic curve, describing the cylinder mass flow as a function of various operating parameters of the internal combustion engine, which for example has been calculated before initial start-up of the internal combustion engine based on test bench measurements, is matched, that is to say adapted to the fresh air mass flow measured and therefore known for various operating points of the internal combustion engine, in such a way that the above equation (1) provides the correct exhaust gas recirculation mass flow at the corresponding operating points except for a proportional error of the air flow sensor installed for measuring the fresh air mass flow. In principle this is also possible without the prior test bench measurements. The initial values for the characteristic curve are arbitrary and only affect the duration of the adaptation.

By means of this adapted characteristic curve representing the cylinder mass flow and the fresh air mass flow measured in each case, the exhaust gas recirculation mass flow can be reliably determined whereby, in contrast to the prior art described at the beginning, errors of the charge air temperature sensors, of the charge pressure sensors or manufacturing tolerances are automatically calibrated out while the particular motor vehicle is in operation and therefore are no longer integrated into any of the gas mass flows determined. In addition response to a wish of the driver can be more rapid, since very fast adaptation of the necessary operating parameters of the internal combustion engine is possible, that is to say the present invention not only allows increased static reliability but also improved dynamic operation.

Since the characteristic curve of the cylinder mass flow is compensated in such a manner that the size of the proportional error of the cylinder mass flow and the fresh air mass flow is equal, the exhaust gas recirculation mass flow also exhibits the same proportional error. When the ratio is formed to determine the exhaust gas recirculation rate this proportional error is cut out and thus eliminated, so that the exhaust gas recirculation rate can in principle be determined according to the invention without errors.

BRIEF DESCRIPTION OF THE DRAWINGS

The present invention is described in detail below on the basis of the accompanying drawing with reference to a preferred embodiment.

The single FIGURE is a simplified illustration of a model for simulating the gas flow in a motor vehicle or a corresponding internal combustion engine in accordance with the present invention.

DETAILED DESCRIPTION OF THE PREFERRED EMBODIMENTS

The FIGURE depicts an internal combustion engine 1 with four combustion chambers or cylinders. The internal combustion engine 1 is coupled with an exhaust gas turbocharger (ATL), which comprises a turbine 2 and a compressor 7, the turbine 2 and the compressor 7 being mounted on a common rail 14, the so-called turbocharger rail. The turbine 2 uses the energy contained in the exhaust gas from the internal combustion engine 1 to drive the compressor 7, which sucks in fresh air through an intake pipe and forces compressed air into the individual combustion chambers of the internal combustion engine 1. The intake fresh air mass flow is measured by an air flow sensor 6 arranged relatively far to the front of the intake area and is thus determined while the internal combustion engine 1 or the motor vehicle is in operation. The exhaust gas turbocharger formed by the turbine 2, the compressor 7 and the turbocharger rail 14 is only connected in terms of flow with the internal combustion engine 1 by the air and exhaust gas mass flow.

The fresh air sucked in and compressed by the compressor 7 is supplied to a so-called equivalent reserve space (ERS) 9 through an intercooler (LLK) 8, which lowers the exhaust gas temperature and thus $NO_X$ emission as well as fuel consumption. As a result of reducing the exhaust gas temperature in the intercooler 8 the air is compressed by oxygen enrichment without however increasing the pressure. The individual combustion chambers of the internal combustion engine 1 are preceded by an inlet manifold (ELS) 10. The exhaust gas produced in the combustion chambers of the internal combustion engine 1 is collected by an exhaust manifold (ASA) 11 and supplied to the turbine 2. The turbine 2 is followed in the exhaust gas flow direction by the exhaust system (APU) 12 of the motor vehicle, which reduces the pollutant components of the exhaust gas arising while the internal combustion engine 1 is in operation and which carries away any remaining exhaust gases as noiselessly as possible. Some of the exhaust gas produced in the combustion chambers of the internal combustion engine 1 is recirculated from the exhaust manifold 11 via an exhaust gas recirculation pipe (AGR) 16 with an exhaust gas recirculation valve 17 to the inlet manifold 10, where the recirculated exhaust gas is mixed with the intake fresh air, and the fresh air/exhaust mixture is supplied to the corresponding cylinder of the internal combustion engine 1.

Moreover a control unit 4 is illustrated, which is a component of a corresponding engine management system of the motor vehicle. The control unit 4 monitors a number of variables or operating parameters of the engine system illustrated, which are recorded by means of corresponding sensors and passed via an interface 3 to the control unit 4. This may involve in particular the fresh air mass flow measured by the air flow sensor 6, the engine speed, the density of the fresh air/exhaust mixture in the connection between the inlet manifold 10 and the internal combustion engine 1, the so-called intake pipe etc. The measurements recorded in this way by the control unit 4 are evaluated, in order, dependent on these, to generate various command signals for the engine management system. As indicated in the FIGURE, the command signals emitted via the interface 3 by the control unit 4 can for example control the pulse-duty factor of the exhaust gas recirculating valve 17 arranged in the exhaust gas recirculation pipe, the guide vane adjustment 15 of the turbine 2 or also the injection time point as well as the amount of air-fuel mixture injected into the individual combustion chambers of the internal combustion engine 1 via an injection system 5 etc.

Valves arranged in the corresponding air or gas paths in FIG. 1 are designated with the reference numeral 13.

Before initial start-up of the internal combustion engine 1 a characteristic diagram or characteristic curve of the cylinder mass flow $dm_{zyl}$, that is to say of the fresh air/exhaust mixture supplied from the inlet manifold 10, which contains the mixing point for the fresh air and the recirculated exhaust gas, to the individual cylinders of the internal combustion engine via the connecting pipe described as the intake pipe, is determined by test bench measurements as a function of various operating parameters of the internal combustion engine. As described at the beginning, the cylinder mass flow $dm_{zyl}$ in a known way depends among other things on the intake pipe pressure, the intake pipe temperature, the density in the intake pipe and the engine speed. The cylinder mass flow $dm_{zyl}$ can thus be modeled as follows:

$$dm_{zyl}=f(p_0,p_1,p_2 \ldots a_0,a_1,a_2 \ldots) \qquad (3)$$

In this case $p_0$, $p_1$, $p_2$ designate various measured values or operating parameters, which are incorporated in the model, while $a_0$, $a_1$, $a_2$ designate coefficients, which describe the model. The physical interrelationship between the individual operating parameters and coefficients does not necessarily have to be known in equation form. Just the presence of a characteristic curve or characteristic diagram or characteristic area, which can be mapped into a polynomial, is also sufficient.

While the internal combustion engine 1 or the corresponding motor vehicle is in operation, the fresh air mass flow $dm_{HFM}$ is measured constantly by the air flow sensor 6 and passed to the control unit 4. The characteristic curve of the cylinder mass flow $dm_{zyl}$ described above is stored in the control unit 4, so that this characteristic curve is known to the control unit 4.

The control unit adapts this characteristic curve during operation in such a manner that in the case of known values of the exhaust gas recirculation mass flow $dm_{AGR}$ the above equation is fulfilled at each operating point of the internal combustion engine 1.

Thus for example the fresh air mass flow $dm_{hfh}$ can always be measured if the exhaust gas recirculation valve 17 arranged in the exhaust gas recirculation pipe 16 is closed, so that $dm_{AGR}=0$ is true. In this case the control unit 4 adapts the characteristic curve of the cylinder mass flow $dm_{zyl}$ in such a manner that as far as possible at each operating point of the internal combustion engine 1 the following is true:

$$0 = dm_{zyl} - dm_{HFM}, \text{ that is to say, } dm_{zyl} = dm_{HFM} \quad (4)$$

The interrelationship according to equation (4) is strived for as described. But due to random errors this is sometimes not feasible, at least not for all measurements in the over-defined case, so that a statistical method, for example the method of the smallest squares, can therefore be used, in order to minimize the standard deviation of the right from the left side of the equation (4).

The characteristic curve of the cylinder mass flow however can also be compensated when the exhaust gas recirculation valve 17 is open, since for example methods are also known for determining the transient value of the exhaust gas recirculation mass flow $dm_{AGR}$ from specific measured operating parameters of the internal combustion engine 1. It is in principle only important that, for compensating the characteristic curve of the cylinder mass flow $dm_{zyl}$ described above, information that is as reliable as possible or estimated is known about the value of the exhaust gas recirculation mass flow $dm_{AGR}$ that is true for the particular operating point, irrespective of the sensors, in particular irrespective of the air flow sensor 6, described above and possibly susceptible to errors. At least the degree of unreliability of the information used should be known.

The characteristic curve of the cylinder mass flow $dm_{zyl}$ for example can be compensated during operation by corresponding adaptation of the coefficients $a_0, a_1, a_2 \ldots$ of the model in accordance with equation (3).

When the characteristic curve for the cylinder mass flow $dm_{zyl}$ is compensated, the above equation (1) using this compensated or adapted characteristic curve for all operating conditions, in particular for relatively low exhaust gas recirculation rates, provides the mass flow through the intake valve corrected except for a possible proportional error of the hot film air flow sensor 6. An additional error no longer arises as a result of the difference being formed in accordance with equation (1), so that the exhaust gas recirculation mass flow $dm_{AGR}$ also only exhibits the proportional error of the hot film air flow sensor 6 at each operating point. Errors of a charge air temperature sensor, a charge pressure sensor or production-related tolerances of the charge air section, which as described can conventionally lead to errors when the cylinder mass flow $dm_{zyl}$ is determined, are automatically eliminated or calibrated out by the above compensation method, while the motor vehicle is in operation, by the control unit 4, and are no longer integrated into any of the specific mass flows, as long as the reading of the sensors involved remains unambiguous.

The compensation method described above is also particularly advantageous for determining the exhaust gas recirculation rate $\Gamma_{AGR}$ in accordance with equation (2). Since the characteristic curve of the cylinder mass flow $dm_{zyl}$ is compensated as described precisely so that the proportional errors of the cylinder mass flow $dm_{zyl}$ and the fresh air mass flow $dm_{HFM}$ are equal, the exhaust gas recirculation mass flow $dm_{AGR}$, which can be derived from this in accordance with equation (1), also has the same proportional error. When the ratio is formed in accordance with equation (2) to determine the exhaust gas recirculation rate $\Gamma_{AGR}$ this proportional error is cut out and therefore eliminated, that is to say the exhaust gas recirculation rate $\Gamma_{AGR}$ can in principle be determined without errors.

We claim:

1. A method for determining the exhaust gas recirculation mass flow of an internal combustion engine, comprising the steps of:

mixing fresh air with exhaust gas from the internal combustion engine recirculated via an exhaust gas recirculation pipe, supplying the resulting gas mixture to at least one cylinder of the internal combustion engine, determining the exhaust gas recirculation mass flow of the exhaust gas recirculated via the exhaust gas recirculation pipe by determining a characteristic curve, dependent on various operating parameters of the internal combustion engine, representing the cylinder mass flow of the gas mixture supplied to the at least one cylinder of the internal combustion engine, measuring the fresh air mass flow of the fresh air, adapting the characteristic curve of the cylinder mass flow to the fresh air mass flow known for various operating points of the internal combustion engine, and determining the exhaust gas recirculation mass flow as a function of the fresh air mass flow measured at a particular transient operating point of the internal combustion engine, using the adapted characteristic curve of the cylinder mass flow.

2. The method according to claim 1, wherein the characteristic curve of the cylinder mass flow is adapted to the fresh air mass flow known for the various operating points of the internal combustion engine, in such a manner that for each of these operating points in the case of at least one known exhaust gas recirculation mass flow the equation $dm_{AGR}=dm_{zyl}-dm_{HFM}$ is at least approximately true, whereby $dm_{AGR}$ designates the known exhaust gas recirculation mass flow, $dm_{zyl}$ the cylinder mass flow according to the adapted characteristic curve and $dm_{HFM}$ the particular known fresh air mass flow.

3. The method according to claim 2, wherein the characteristic curve of the cylinder mass flow is adapted to the fresh air mass flow known for the various operating points of the internal combustion engine, such that for each of these operating points in the case of a known exhaust gas recirculation mass flow of zero the equation $dm_{zyl}=dm_{HFM}$ is true.

4. The method according to claim 1, wherein the exhaust gas recirculation rate of the exhaust gas recirculated via the exhaust gas recirculation pipe is calculated from the exhaust gas recirculation mass flow determined in each case in accordance with the method and the fresh air mass flow measured in each case by forming a ratio.

5. The method according to claim 1, wherein the characteristic curve of the cylinder mass flow is adapted while the internal combustion engine is in operation.

6. The method according to claim 1, wherein the exhaust gas recirculating mass flow is determined at each operating point of the internal combustion engine from the adapted characteristic curve for the cylinder mass flow, and the fresh air mass flow measured in each case at this operating point in accordance with the equation $dm_{AGR}=dm_{zyl}-dm_{HFM}$, whereby $dm_{AGR}$ designates the exhaust gas recirculating mass flow to be determined, $dm_{zyl}$ the cylinder mass flow in accordance with the adapted characteristic curve and $dm_{HFM}$ the fresh air mass flow measured in each case.

7. A device for determining the exhaust gas recirculation mass flow of an internal combustion engine, comprising:
- an exhaust gas recirculation pipe for recirculating fresh air mixed with an exhaust gas from the internal combustion engine
- at least one cylinder of the internal combustion engine receiving said gas mixture,
- fresh air mass flow measuring means for measuring the fresh air mass flow of the fresh air,
- exhaust gas recirculation mass flow determination means for determining the exhaust gas recirculating mass flow of the exhaust gas recirculated via the exhaust gas recirculation pipe, whereby the exhaust gas recirculation mass flow determination means are designed in such a way that they determine the exhaust gas recirculation mass flow on the basis of a characteristic curve of the cylinder mass flow of the gas mixture supplied to the at least one cylinder of the internal combustion engine, dependent on various operating parameters of the internal combustion engine and on the basis of the fresh air mass flow measured by the fresh air mass flow measuring means, wherein the exhaust gas recirculation mass flow determination means are designed in such a way that they adapt the characteristic curve of the cylinder mass flow to the fresh air mass flow known for various operating points of the internal combustion engine, and determine the exhaust gas recirculation mass flow as a function of the fresh air mass flow measured at a particular transient operating point of the internal combustion engine using the adapted characteristic curve of the cylinder mass flow.

8. The device according to claim 7, wherein the exhaust gas recirculation mass flow determination means are designed to adapt the characteristic curve of the cylinder mass flow to the fresh air mass flow known for the various operating points of the internal combustion engine, in such a manner that for each of these operating points in the case of at least one known exhaust gas recirculation mass flow the equation $dm_{AGR}=dm_{zyl}-dm_{HFM}$ is at least approximately true, whereby $dm_{AGR}$ designates the known exhaust gas recirculation mass flow, $dm_{zyl}$ the cylinder mass flow according to the adapted characteristic curve and $dm_{HFM}$ the particular known fresh air mass flow.

9. The device according to claim 8, wherein the exhaust gas recirculation mass flow determination means are designed to adapt the characteristic curve of the cylinder mass flow to the fresh air mass flow known for the various operating points of the internal combustion engine, such that for each of these operating points in the case of a known exhaust gas recirculation mass flow of zero the equation $dm_{zyl}=dm_{HFM}$ is true.

10. The device according to claim 7, wherein the exhaust gas recirculation mass flow determination means are designed to calculate the exhaust gas recirculation rate of the exhaust gas recirculated via the exhaust gas recirculation pipe from the exhaust gas recirculation mass flow determined in each case in accordance with the method and the fresh air mass flow measured in each case by forming a ratio.

11. The device according to claim 7, wherein the exhaust gas recirculation mass flow determination means are designed to adapt the characteristic curve of the cylinder mass flow while the internal combustion engine is in operation.

12. The device according to claim 7, wherein the exhaust gas recirculation mass flow determination means are designed to determine the exhaust gas recirculating mass flow at each operating point of the internal combustion engine from the adapted characteristic curve for the cylinder mass flow, and to measure the fresh air mass flow in each case at this operating point in accordance with the equation $dm_{AGR}=dm_{zyl}-dm_{HFM}$, whereby $dm_{AGR}$ designates the exhaust gas recirculating mass flow to be determined, $dm_{zyl}$ the cylinder mass flow in accordance with the adapted characteristic curve and $dm_{HFM}$ the fresh air mass flow measured in each case.

* * * * *